W. A. McDonald.
Wood Molding Mach.
N°. 89,937. Patented May 11, 1869.
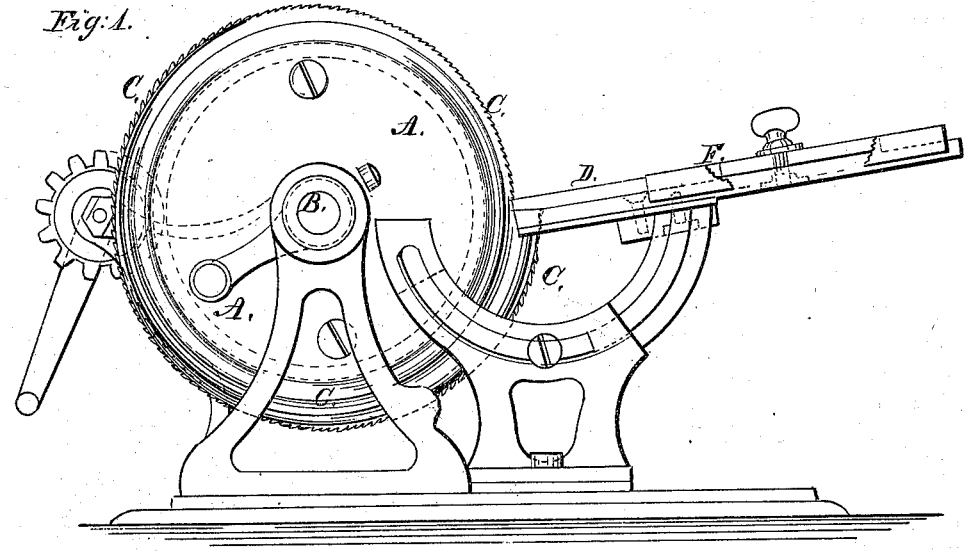
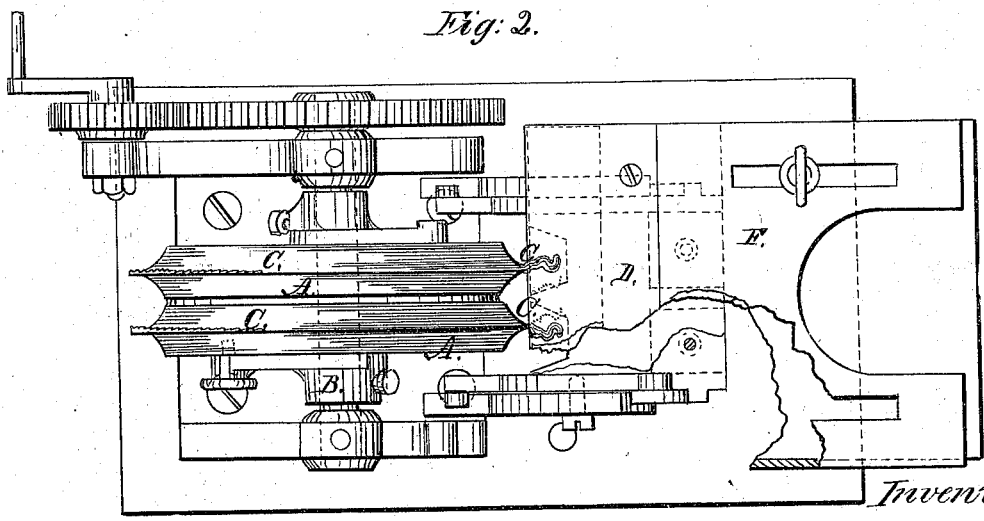
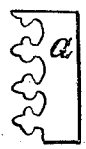
Witnesses:
Ah. Becker.
John F. Brooks
Inventor.
W. A. McDonald,
by Munn & Co
Attys.

United States Patent Office.

W. A. McDONALD, OF MORRISANIA, NEW YORK.

Letters Patent No. 89,937, dated May 11, 1869.

---

IMPROVEMENT IN MACHINE FOR CUTTING MOULDINGS IN WOOD.

---

The Schedule referred to in these Letters Patent and making part of the same.

---

*To all whom it may concern:*

Be it known that I, W. A. McDONALD, of Morrisania, in the county of Westchester, and State of New York, have invented a new and improved Wood-Moulding Machine; and I do hereby declare that the following is a full, clear, and exact description thereof, which will enable others skilled in the art to make and use the same, reference being had to the accompanying drawings, forming part of this specification, in which—

Figure 1 represents a side elevation of my improved wood-moulding machine.

Figure 2 is a plan or top view, partly in section, of the same.

Similar letters of reference indicate corresponding parts.

This invention relates to a new machine for sawing the faces of mouldings and of ornamental designs, by means of circular or straight saws, so that, especially for ornamental pendants and projections, the machine can be advantageously employed.

The invention consists more particularly in the application of a new saw-blade which has the cross-section of the moulding to be cut, and which is gradually tapered to a point, and toothed on its tapering edge, so that every portion of the cross-section is thereby made to cut.

A, in the drawing, represents a disk or head on a rotating shaft, B, and carrying the saw C.

The blade of the saw is corrugated, or stamped in form of the moulding to be cut, as indicated in fig. 2, and is then tapered from end to end, so that it will have its full width at one end, and run to a point at the other end, as is clearly shown in fig. 1.

The tapering edge of the saw is the toothed and cutting-edge of the same.

As the cross-section of the blade was established before the taper was put on, the teeth of the saw will stand in line with the cross-section, and will, therefore, as the saw is drawn through the wood, commencing at the thin end, make an incision in the wood equal to the cross-section of the saw. Thus C-shaped, as well as S and Z-shaped incisions can be produced in the wood.

By having two saws of equal shape, but reversed, as in fig. 2, set on one block, or work, at least, on the same piece of wood, the incisions will be made in opposite directions, to separate from the wood such portions as are necessary to leave ornamental projections, as shown at C in the red-lined diagram.

The wood to be sawed is placed upon a suitable bed, D, and can be adjusted on the same by means of gauge-marks, to have the incisions made the requisite distances apart.

The bed may be pivoted, as in fig. 1, so that it can be placed at a suitable incline, and should be provided with a guide-plate, F, by which the wood is guided in the proper position, while it is fed, to have different incisions made.

It will be understood that the wood remains stationary while the saw is cutting it, and that it is only moved to have a new-incision made.

Whenever the saw enters at its thin end, and is drawn through the wood, it will make an incision equal in shape to its cross-section.

Having thus described my invention,

I claim as new, and desire to secure by Letters Patent—

1. The stamped or moulded saw-blade C, when formed with the requisite angular, curved, or irregular cross-section, and tapered toward one end, its teeth being on the tapering edge, as shown, operating as described, for the purpose specified.

2. Arranging two moulded tapering saw-blades C, which are constructed as herein described, on one machine, to cut into the edge of a wooden plate, as herein set forth, for the purpose specified.

W. A. McDONALD.

Witnesses:
FRANK BLOCKLEY,
ALEX. F. ROBERTS.